INVENTOR.
James L. Amos
BY
Griswold & Burdick
ATTORNEYS

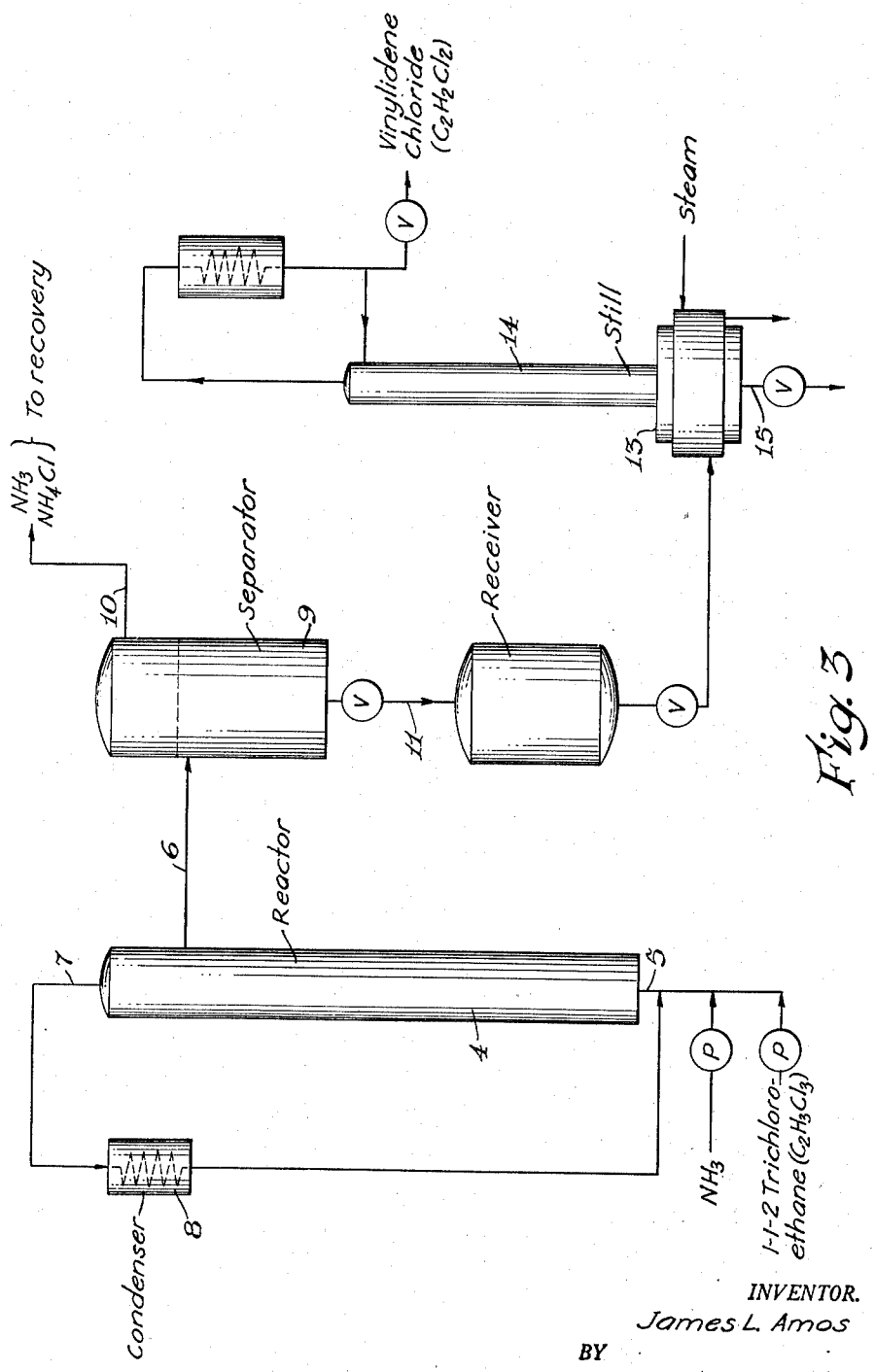

Patented Sept. 9, 1952

2,610,214

UNITED STATES PATENT OFFICE 2,610,214

METHOD OF PREPARING VINYLIDENE CHLORIDE

James L. Amos, Midland, Mich., assignor to The Dow Chemical Company, Midland, Mich., a corporation of Delaware Application March 5, 1949, Serial No. 79,738

3 Claims. (Cl. 260—654)

This invention relates to a new method of preparation vinylidene chloride.

The invention is based on the discovery that vinylidene chloride may be produced in good yield and with extremely high purity by the reaction of 1.1.2-trichloroethane and anhydrous ammonia, according to the equation:

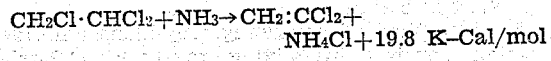

$$CH_2Cl \cdot CHCl_2 + NH_3 \rightarrow CH_2:CCl_2 + NH_4Cl + 19.8 \text{ K-Cal/mol}$$

Crystalline ammonium chloride is also produced in recoverable form.

Figure 1:
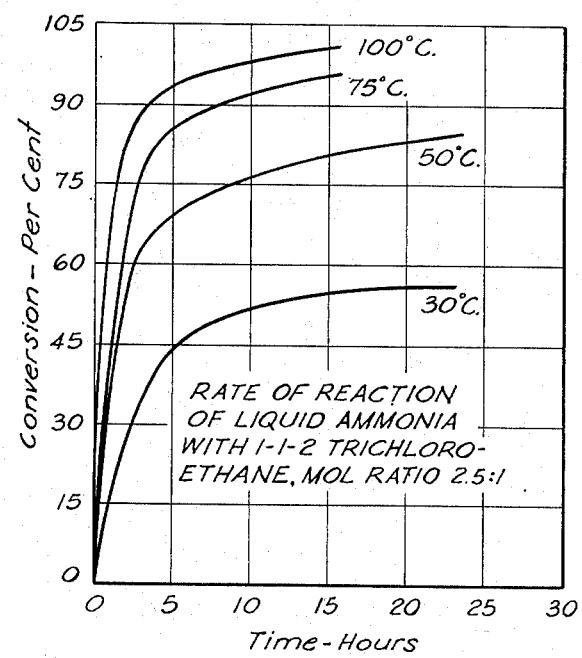
Figure 2:
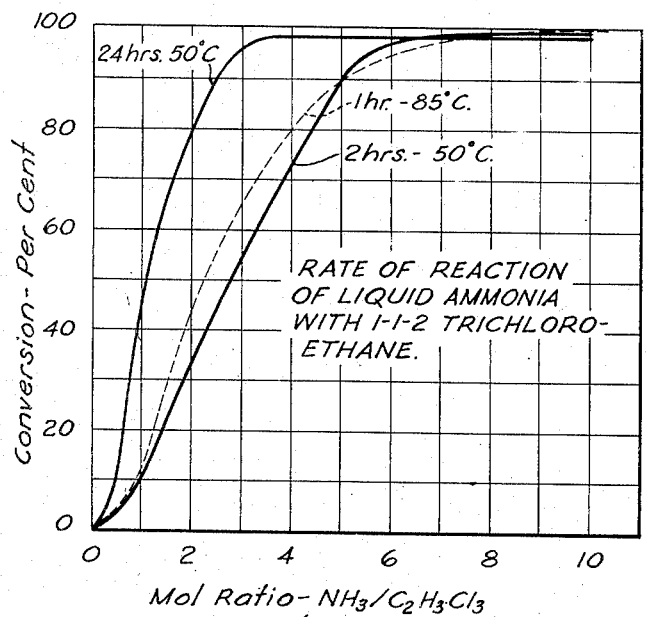

The new process will be described with reference to the accompanying drawings in which Fig. 1 is a graph showing the rate of the new reaction at several temperatures;

Fig. 2 is a graph showing the effect of the molecular ratio of the reactants on the rate of the reaction; and Fig. 3 is a diagrammatic flowsheet showing one arrangement of apparatus for carrying out the new process on a commercial scale.

The 1.1.2-trichloroethane and anhydrous ammonia interact spontaneously, with evolution of heat, upon mixing of the two substances. For practical reasons, it is highly preferable to operate in the liquid phase. To this end the reactants are usually first liquefied, either by cooling or by application of pressure, mixed, and the mixture kept liquid by maintaining it under a pressure at least equal to its autogenous pressure. The interaction will proceed in the presence of non-aqueous diluents, but no advantage has been found in their use.

The rate of the reaction is dependent on temperature, with the range of about 0° to about 100° C. being commercially practical. Below 0° C. the rate is extremely slow, whereas above 100° C. excessive pressure is required to maintain the mixture liquid. Temperatures above 40° C. are highly preferred, with 40° to 75° C. being optimal.

The speed and completion of the reaction are also functions of the relative proportions of the 1.1.2-trichloroethane and the ammonia. In general, a molecular excess of the latter, i. e. more than one mol of ammonia per mol of trichloroethane, is preferred to drive the reaction to completion. Maximum conversions in the least time are realized when the ammonia represents from 200 to 1000 mol per cent of the trichloroethane, with 300 to 600 mol per cent being perhaps most satisfactory.

Since the rate of the reaction is comparatively slow, the reactant mixture should be maintained at the process temperature for a time sufficient to permit substantial, and preferably nearly complete, conversion of the 1.1.2-trichloroethane to vinylidene chloride. Ordinarily at least one hour is required for completion, while longer times, from 2 to 10 hours, are more common.

The quantitative interrelation of rate, temperature, and molecular ratio of 1.1.2-trichloroethane and liquid anhydrous ammonia, for certain conditions, is given in the drawing. In Fig. 1 there is set forth the per cent conversion of 1.1.2-trichloroethane to vinylidene chloride by 250 mol per cent of ammonia at temperatures of 30°, 50°, 75° and 100° C. after various times. In Fig. 2 there appears the percent conversion at different mol ratios of ammonia to trichloroethane after 2 hours and after 24 hours at 50° C. and after 1 hour at 85° C. From these curves it is possible to select the appropriate operating conditions to fit any desired production schedule.

The procedure by which the products formed in the reaction are recovered depends somewhat upon the process conditions. At temperatures above 0° C., the liquid ammonia and 1.1.2-trichloroethane reactants and the vinylidene chloride product are infinitely miscible with one another. In contrast, the ammonia chloride product is insoluble in the two organic substances and only slightly soluble in mixtures of them with ammonia but is highly soluble in liquid ammonia itself. Hence, when the reaction is carried out with less than 3 mols of ammonia per mol of 1.1.2-trichloroethane, most of the ammonium chloride product separates out as a solid phase. It may be separated by filtration, after which the filtrate may be separated into components by rectification. On the other hand, when more than 300 mol per cent of ammonia is present in the initial mixture, the ammonium chloride remains dissolved in it, and the reaction product separates into two immiscible liquid layers, the upper being almost entirely a solution of ammonium chloride in ammonia and the lower containing the organic materials and some ammonia. In this case, the lower layer can simply be drawn off and subjected to fractional distillation to separate the vinylidene chloride.

In view of the extreme corrosiveness of ammonium chloride, care must be exercised in choosing the materials of construction for the process equipment. Glass-lined or stainless steel clad pressure vessels are most satisfactory.

A preferred arrangement of apparatus for carrying out the new process continuously on a large scale is indicated diagrammatically in Fig. 3, being used for reactions where two separate liquid phases are present in the product. As shown, the reaction takes place in a long vertical tubular pressure vessel 4 provided with a bottom inlet 5, side outlet 6, and top vent 7 leading to a condenser 8 from which the condensate returns to the inlet 5. The liquid ammonia and 1.1.2-trichloroethane are separately metered in the desired relative proportions and rates into the inlet 5 by high-pressure pumps. They mix immediately and pass into the reactor 4 where they remain for whatever contact time is afforded by the rate of pumping, usually 2 to 10 hours. Since heat is evolved by the reaction, ammonia tends to vaporize and escape to the condenser 8. The temperature may be controlled by regulating the pressure at which this vaporization takes place.

A stream of reacted mixture continuously overflows through the outlet 6 into a liquid-liquid separator 9 where it settles into two layers. The upper layer, of ammonium chloride dissolved in ammonia, is withdrawn through a side outlet 10 and forwarded to other apparatus, not shown, for separating the ammonium chloride and recovering the ammonia for re-use. The lower layer, of vinylidene chloride, any unreacted trichlorethane, and some ammonia, flows through a bottom outlet 11 to a storage receiver. From there it is passed as needed to a conventional steam-heated still 13 and fractionating column 14. This still is operated to distill off and condense the ammonia and then the vinylidene chloride, the latter being taken as a separate fraction of high purity. Higher boiling residues are removed through a drain 15.

The new reaction according to the invention is unusually clean-cut. There are practically no side-reactions and there seems to be little if any interaction between the vinylidene chloride product and the excess ammonia and but little polymerization of the vinylidene chloride. The process is further advantageous because of the fact that liquid ammonia exerts a purifying action on vinylidene chloride, apparently by destroying or restraining distillation of impurities which accompany this material when prepared by other processes. In consequence, the vinylidene chloride produced is of exceptional quality, usually being at least 99.7 per cent pure, and hence is a high grade of monomer for use in the manufacture of polymeric resins.

The following examples will further illustrate the invention, but are not to be construed as limiting its scope.

*Example 1*

A charge of 328 grams of liquid ammonia cooled to about −70° C. was placed in an empty steel cylinder of 1920 cc. capacity cooled to the same temperature, and 620 grams of 1.1.2-trichloroethane was added. The cylinder was then closed and immersed in water at 10° C. for 12.5 hours. At the end of this time the cylinder was removed and opened, being vented through a trap at −70° C. It was found to contain a layer of solid matter, mostly ammonium chloride, and a liquid reaction product. The solid was removed by filtration and the filtrate was distilled fractionally to separate it into its components. There was recovered in all 234 grams of unreacted ammonia, 171 grams of vinylidene chloride, 236 grams of unreacted trichloroethane, and 218 grams of ammonium chloride. The vinylidene chloride recovered corresponded to a 38 per cent conversion of the 1.1.2-trichloroethane initially added.

*Example 2*

The apparatus shown in Fig. 3 was operated continuously on a semi-plant scale at a temperature of 45° to 50° C. with 5 mols of ammonia per mol of 1.1.2-trichloroethane. Contact time in the reactor was 2.0 hours. The upper layer from the separator contained 54 per cent by weight of ammonia and 46 per cent ammonium chloride. The bottom or organic layer contained 73.6 per cent vinylidene chloride, 13.2 per cent trichloroethane, 12.9 per cent ammonia, and 0.3 per cent ammonium chloride. Vinylidene chloride of 99.7 per cent purity and white amonium chloride crystals 98.4 per cent pure were recovered.

Attention is directed to U. S. Patent 2,541,724, issued February 13, 1951, to the assignee of this application, in which is claimed a method of separating ammonium chloride from solution in liquid ammonia, using vinylidene chloride as a heating medium.

What is claimed is:

1. A method of producing vinylidene chloride which consists in mixing together 1.1.2-trichloroethane and from 300 to 600 mol per cent thereof of liquid anhydrous ammonia, subjecting the mixture to a temperature between 40° and 75° C. under a pressure at least equal to the autogenous pressure of the mixture for a time between 2 and 10 hours, allowing the resulting product to separate into layers, withdrawing the organic layer, and separating vinylidene chloride therefrom by fractional distillation.

2. A method of producing vinylidene chloride which consists in mixing together 1.1.2-trichloroethane and from 200 to 1000 mol per cent thereof of liquid anhydrous ammonia, subjecting the mixture in the liquid phase to a temperature between 0° and 100° C. for a time sufficient for substantial reaction between the components, separating the organic products of the reaction, and recovering vinylidene chloride therefrom.

3. A method according to claim 2 wherein the reaction temperature is at least 40° C. and the reaction time at least one hour.

JAMES L. AMOS.

REFERENCES CITED

The following references are of record in the file of this patent:

UNITED STATES PATENTS

| Number | Name | Date |
|---|---|---|
| 1,343,716 | Guyot | June 15, 1920 |
| 1,921,879 | Herrmann et al. | Aug. 8, 1933 |

FOREIGN PATENTS

| Number | Country | Date |
|---|---|---|
| 349,872 | Great Britain | June 4, 1931 |

OTHER REFERENCES

"Chemical Abstracts," vol. 37, cols. 5693–4 (1943); vol. 40, col. 3392 (1946). (Abstracts of articles by Mkryan).